(12) United States Patent  
Chamberlain

(10) Patent No.: US 7,907,796 B2  
(45) Date of Patent: *Mar. 15, 2011

(54) ALIGNMENT OF TAPE CARTRIDGE ACCESSOR

(75) Inventor: Lyle Joseph Chamberlain, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 12/242,375

(22) Filed: Sep. 30, 2008

(65) Prior Publication Data

US 2009/0022425 A1    Jan. 22, 2009

Related U.S. Application Data

(62) Division of application No. 09/957,948, filed on Sep. 20, 2001, now Pat. No. 7,474,781.

(51) Int. Cl.
*G06K 9/36* (2006.01)
*G06F 7/00* (2006.01)

(52) U.S. Cl. .......... 382/291; 901/47; 700/214; 700/245; 369/30.31

(58) Field of Classification Search ............... 382/153, 382/291; 901/47; 700/214, 245; 369/30.31
See application file for complete search history.

(56) References Cited

U.S. PATENT DOCUMENTS

| | | |
|---|---|---|
| 3,831,197 A | 8/1974 | Beach et al. |
| 4,305,130 A | 12/1981 | Kelley et al. |
| 4,373,804 A | 2/1983 | Pryor et al. |
| 4,481,592 A | 11/1984 | Jacobs et al. |
| 4,539,703 A | 9/1985 | Clearman et al. |
| 4,707,647 A | 11/1987 | Coldren et al. |
| 4,737,845 A | 4/1988 | Susuki et al. |
| 4,738,025 A | 4/1988 | Arnold |
| 4,937,690 A | 6/1990 | Yamashita et al. |
| 4,945,429 A | 7/1990 | Munro et al. |
| 4,979,135 A | 12/1990 | Moy |
| 5,034,904 A | 7/1991 | Moy |
| 5,164,909 A | 11/1992 | Leonhardt et al. |
| 5,219,258 A | 6/1993 | Yeakley |
| 5,237,468 A | 8/1993 | Ellis |
| 5,280,179 A | 1/1994 | Pryor et al. |
| 5,297,238 A | 3/1994 | Wang et al. |
| 5,323,327 A | 6/1994 | Carmichael et al. |
| 5,384,609 A | 1/1995 | Ogawa et al. |
| 5,416,914 A | 5/1995 | Korngiebel et al. |
| 5,579,444 A | 11/1996 | Dalziel et al. |
| 5,693,953 A | 12/1997 | Pryor et al. |
| 5,737,217 A | 4/1998 | Nishikawa et al. |
| 5,751,844 A | 5/1998 | Bolin et al. |
| 5,767,525 A | 6/1998 | Pryor et al. |
| 5,774,301 A | 6/1998 | Manes et al. |
| 5,786,602 A | 7/1998 | Pryor et al. |
| 5,811,827 A | 9/1998 | Pryor et al. |
| 5,835,684 A | 11/1998 | Bourne et al. |
| 5,878,151 A | 3/1999 | Tang et al. |

(Continued)

*Primary Examiner* — John B Strege
(74) *Attorney, Agent, or Firm* — Griffiths & Seaton PLLC

(57) ABSTRACT

A method for aligning a tape cartridge accessor with cartridges in cells of a tape cartridge magazine is provided. IR illumination is applied to an object expected to include a desired physical feature. Specular reflections are received from the illuminated object to create an image of the object. Dynamic image thresholding is applied to the image to select an optimum gray scale level of the image expected to include the desired physical feature. Bounding boxes are used to identify the location of the desired physical feature in the thresholded image.

15 Claims, 5 Drawing Sheets

U.S. PATENT DOCUMENTS

| | | |
|---|---|---|
| 5,889,926 A | 3/1999 | Bourne et al. |
| 5,896,472 A | 4/1999 | Takayama |
| 5,909,504 A | 6/1999 | Whitman |
| 5,989,835 A * | 11/1999 | Dunlay et al. .................. 506/10 |
| 6,331,714 B1 * | 12/2001 | Gardner et al. .......... 250/559.29 |
| 6,457,645 B1 * | 10/2002 | Gardner, Jr. ............. 235/462.23 |
| 6,728,391 B1 * | 4/2004 | Wu et al. ....................... 382/101 |
| 6,788,411 B1 | 9/2004 | Lebens |
| 7,269,284 B2 | 9/2007 | Chamberlain |
| 7,474,781 B2 * | 1/2009 | Chamberlain ................ 382/153 |
| 2002/0134840 A1 * | 9/2002 | Reasoner et al. ........ 235/462.22 |

* cited by examiner

ALIGNMENT OF TAPE CARTRIDGE ACCESSOR

CROSS-REFERENCE TO RELATED APPLICATION

This application is a division of U.S. application Ser. No. 09/957,948, filed Sep. 20, 2001, which is incorporated herein by reference.

BACKGROUND OF THE INVENTION

1. Field of the Invention

This invention relates in general to automated tape library systems, and more particularly to an image based bar code reading and robotic registration apparatus and method for use in automated tape library systems.

2. Description of Related Art

Magnetic tape has long been used as a storage media for audio, video and computer information. Tape cartridges have been used extensively because they provide a convenient way to house and support a length of magnetic tape for engagement by a transducer in a tape drive while protecting the tape upon removal of the cartridge.

Storage libraries provide large capacity secondary storage to modern computing requirements. Such storage libraries typically employ robotic control mechanisms used by a host computer to physically manage tape media cartridges. A plurality of tape cartridges are stored within a storage library. Each tape cartridge is in a particular slot in the storage library. Each slot is identifiable by its physical position in the storage library. Each tape cartridge is typically uniquely identified by a machine readable label. The storage library maintains inventory information to associate a particular tape cartridge with a particular slot in the storage library. Responsive to a host computer request, a robotic mechanism or picker physically retrieves an appropriate tape cartridge from its associated slot in the storage library, moves the tape cartridge to an appropriate read/write device for processing, and inserts the tape cartridge into the device.

The robotic mechanism typically includes a hand or gripper mechanism positioned on a movable arm. To retrieve a tape cartridge, the arm moves to position the gripper near the slot holding the desired tape cartridge. The gripper then extends and grips the tape cartridge and retracts to take the tape cartridge out of the slot. The arm with the hand gripping the tape cartridge moves to the device and the hand then extends and inserts the tape cartridge into the device. Conversely, when the use of the tape cartridge is complete, the robotic mechanism retrieves the tape cartridge from the read/write device, moves the tape cartridge adjacent its associated slot according to the inventory maintained by the storage library, and inserts the tape cartridge into the storage slot of the storage library ready for future use in response to another host computer request.

A problem with prior automated storage libraries designs which contributed to their relatively higher complexity and resultant higher costs relates to the multiplicity and complexity of various sensing mechanisms used to sense several parameters of the operating storage library. Picker registration has proven to be a problem, resulting in occasional dropped cartridges and decreased system performance. Past registration techniques made of a "flying spot" paradigm, using an LED retroreflective sensor to locate the position of a few fiducial marks and then calculate the theoretical position of every cartridge cell in robot coordinates to initialize its position table. In practice this method has been less than perfect, with some systems suffering jams or drops. Other techniques have used a dedicated vision processor and bulky CCD camera with incandescent lighting. However, the production cost of such a system is high.

Such excessive cost has been addressed by using a laser-based scanner for the barcodes, and a "flying spot" sensor for registration. However, registration accuracy has proven to be a problem because the environment is dynamic and the robot accessor (picker) begins to drift over time. Recalibration with the sensor requires complete control of the robot, halting all other operations. Other camera-based vision systems in tape libraries have been used that depend on special fiducial markings for registration. Accordingly, a cost-effective imaging system for aligning a picker in an automated tape library system has not been developed.

It can be seen that there is a need for an image-based bar-code reading and robotic registration apparatus and method for use in automated tape library systems.

SUMMARY OF THE INVENTION

To overcome the limitations in the prior art described above, and to overcome other limitations that will become apparent upon reading and understanding the present specification, the present invention discloses an image based barcode reading and robotic registration apparatus and method for use in automated tape library systems.

The present invention solves the above-described problems by positioning an imager on picker assembly with its own illumination source and appropriate optics to filter out ambient light. The imager connects to a microprocessor in its immediate vicinity. All image acquisition and processing are done by these components. To ensure operation independent of illumination variations, the image processing code developed for this invention automatically adapts to dynamic lighting situations.

A system in accordance with the principles of the present invention includes a picker assembly, an imager disposed on the front of the picker assembly, illumination sources disposed at the front of the picker assembly and a processor, coupled to the imager and illumination sources, for processing image data obtained from the imager and for controlling the illumination sources.

Other embodiments of a system in accordance with the principles of the invention may include alternative or optional additional aspects. One such aspect of the present invention is that the system further includes optics selected to filter out ambient light.

Another aspect of the present invention is that the processor performs image processing on the image data to automatically adapt to dynamic lighting situations.

Another aspect of the present invention is that the system further includes an external bus interface for coupling the processor to an external communications bus.

Another aspect of the present invention is that the imager further comprises a camera and lens assembly.

Another aspect of the present invention is that the imager further comprises an IR filter coupled to the lens assembly.

Another aspect of the present invention is that the illumination source comprises IR LED lighting assemblies.

Another aspect of the present invention is that the system further includes LED drivers disposed between the processor and the IR LED lighting assemblies, the LED drivers receiving control signals from the controller and providing drive signals to the IR LED lighting assemblies.

Another aspect of the present invention is that the processor comprises a microcontroller.

Another aspect of the present invention is that the imager receives specular reflection off of the tape cartridge cells during calibration operations to allow tape cartridge registration without fiducial markings.

Another aspect of the present invention is that the imager uses the tape cartridge cells as fiducials to allow tape cartridge registration without fiducial markings.

Another aspect of the present invention is that the use of the tape cartridge cells as fiducials maximizes storage capability.

Another aspect of the present invention is that the imager detects bar codes on the tape cartridges to identify the tape cartridges.

Another aspect of the present invention is that the processor operates in two states to provide tape cartridge position registration and to provide bar code resolution.

Another aspect of the present invention is that the processor outputs the values of bar-codes when the processor is configured to provide bar code resolution Another aspect of the present invention is that the processor outputs an offset value of some detected image feature from its nominal location in the x, y plane when the processor is configured to provide tape cartridge position registration.

Another aspect of the present invention is that the processor continuously visually verifies the position of the picker to eliminate the need for time-consuming recalibration.

In another embodiment of the present invention, a method for aligning a tape cartridge accessor with cartridges in cells of a tape cartridge magazine is provided. The method includes applying IR illumination to an object expected to include a desired physical feature, receiving specular reflections from the illuminated object to create an image of the object, applying dynamic image thresholding to the image to select an optimum gray scale level of the image expected to include the desired physical feature and using bounding boxes to identify the location of the desired physical feature in the thresholded image.

Another aspect of the method of the present invention is that the desired physical feature comprises a corner of a cell in a tape cartridge magazine.

Another aspect of the method of the present invention is that the applying dynamic image thresholding enhances relevant portions of the image and suppresses irrelevant portions of the image.

Another aspect of the method of the present invention is that the tape cartridge cells are used as fiducials to allow tape cartridge registration without fiducial markings.

Another aspect of the method of the present invention is that the use of the tape cartridge cells as fiducials maximizes storage capability.

In another embodiment of the present invention, an article of manufacture comprising a program storage medium readable by a computer is disclosed. The medium tangibly embodies one or more programs of instructions executable by the computer to perform a method for aligning a tape cartridge accessor with cartridges in cells of a tape cartridge magazine, wherein the method includes applying IR illumination to an object expected to include a desired physical feature, receiving specular reflections from the illuminated object to create an image of the object, applying dynamic image thresholding to the image to select an optimum gray scale level of the image expected to include the desired physical feature and using bounding boxes to identify the location of the desired physical feature in the thresholded image.

Another aspect of the article of manufacture of the present invention is that the desired physical feature comprises a corner of a cell in a tape cartridge magazine.

Another aspect of the article of manufacture of the present invention is that the applying dynamic image thresholding enhances relevant portions of the image and suppresses irrelevant portions of the image.

Another aspect of the article of manufacture of the present invention is that the tape cartridge cells are used as fiducials to allow tape cartridge registration without fiducial markings.

Another aspect of the article of manufacture of the present invention is that the use of the tape cartridge cells as fiducials maximizes storage capability.

In another embodiment of the present invention, a picker system for use in aligning a tape cartridge accessor with cartridges in cells of a tape cartridge magazine is provided. The picker system includes a picker assembly, illumination means disposed at the picker assembly for illuminating an object, imaging means disposed on the picker assembly for gathering image data of the object and processing means, coupled to the imager and illumination sources, for processing the image data obtained from the imaging means and for controlling the illuminating means.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings that form a part hereof, and in which is shown by way of illustration the specific embodiment in which the invention may be practiced. It is to be understood that other embodiments may be utilized as structural changes may be made without departing from the scope of the present invention.

The present invention provides an image-based bar-code reading and robotic registration apparatus and method for use in automated tape library systems. The present invention positions an imager on a picker assembly with its own illumination source and appropriate optics to filter out ambient light. The imager connects to a microprocessor in its immediate vicinity. All image acquisition and processing are done by these components. To ensure operation independent of illumination variations, the image processing code developed for this invention automatically adapts to dynamic lighting situations.

Figure 1:
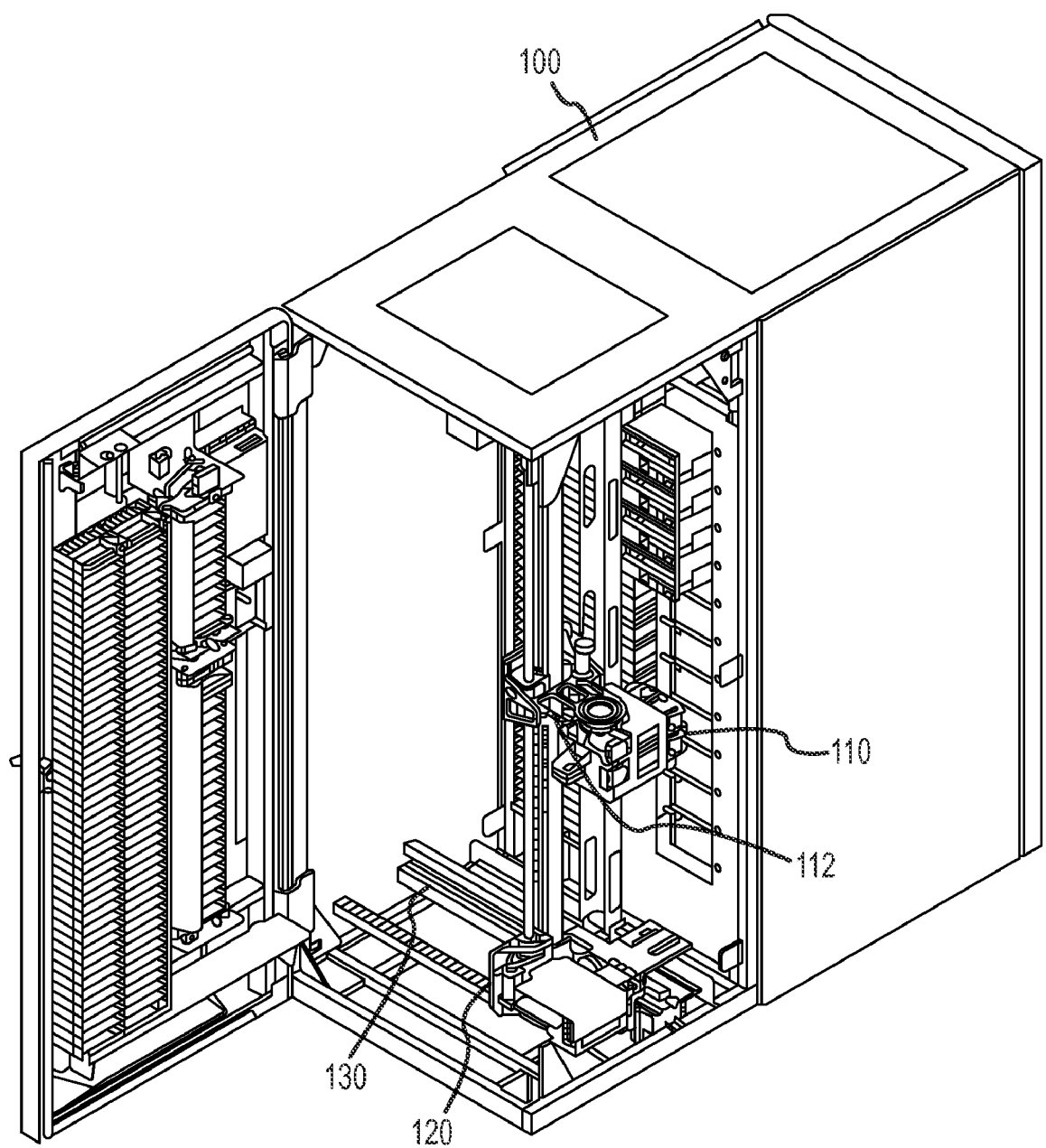
FIG. 1 illustrates an automatic tape library in accordance with the present invention.

FIG. 1 illustrates an automatic tape library system 100 in accordance with the present invention. As shown in FIG. 1, the tape library includes a dual gripper assembly 110 coupled to a gripper/picot assembly 112. The gripper assembly 110 moves in the y-axis along the y-axis assembly 120 and in the x-axis along the x-axis assembly 130.

Figure 2:
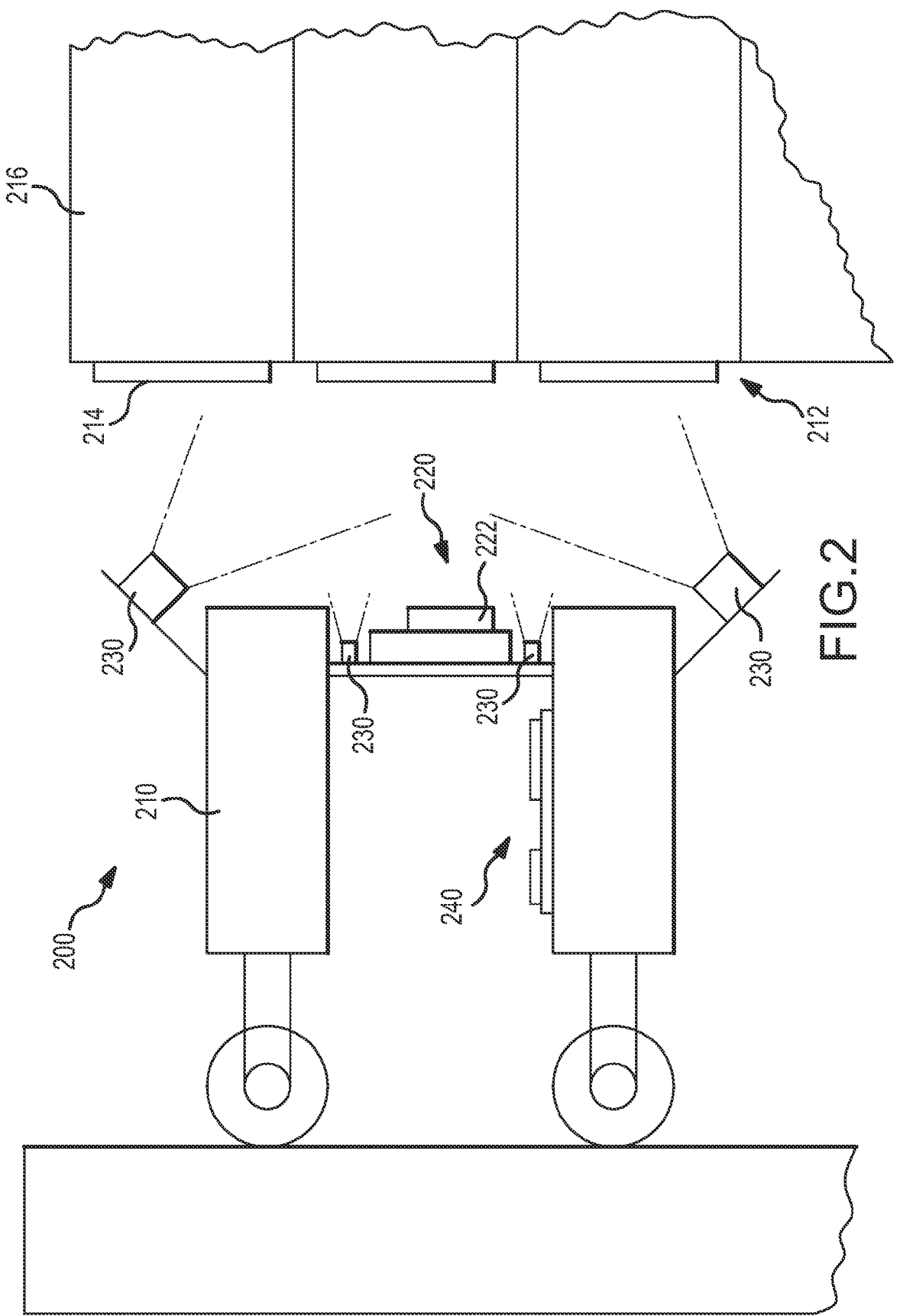
FIG. 2 illustrates an image based bar-code reading and robotic registration apparatus for use in automated tape library systems according to the present invention.

FIG. 2 illustrates an image-based bar-code reading and robotic registration apparatus 200 for use in automated tape library systems according to the present invention. In FIG. 2, a picker assembly 210 is disposed along the outside of a cartridge magazine 212. The cartridge magazine 212 includes cartridges 214 in the cartridge cells 216. The picker 210 includes an imager 220, such as a camera (CCD, CMOS, etc.), positioned on the front of the picker assembly 210. The imager 220 includes appropriate optics 222 selected to filter out ambient light. Illumination 230 sources are disposed on the picker 210. The imager 220 connects to a microprocessor or microcontroller 240 that may be disposed in the immediate vicinity of the imager 220. All image acquisition and processing are done by the imager 220 and microcontroller 240.

To ensure operation independent of illumination variations, the image processing automatically adapts to dynamic lighting situations. Output format is dependent upon the host system, for example, a serial or Controller Area Network (CAN) bus. The imager 220 provides an inexpensive self-contained image processing system to visually verify the alignment of the picker 210 with the cartridges 214. The tape cartridge cells 216 are used as fiducials to allow tape cartridge registration without fiducial markings. The use of the tape cartridge cells 216 as fiducials maximizes storage capability. Registration can be checked with every pick, greatly increasing reliability.

Figure 3:
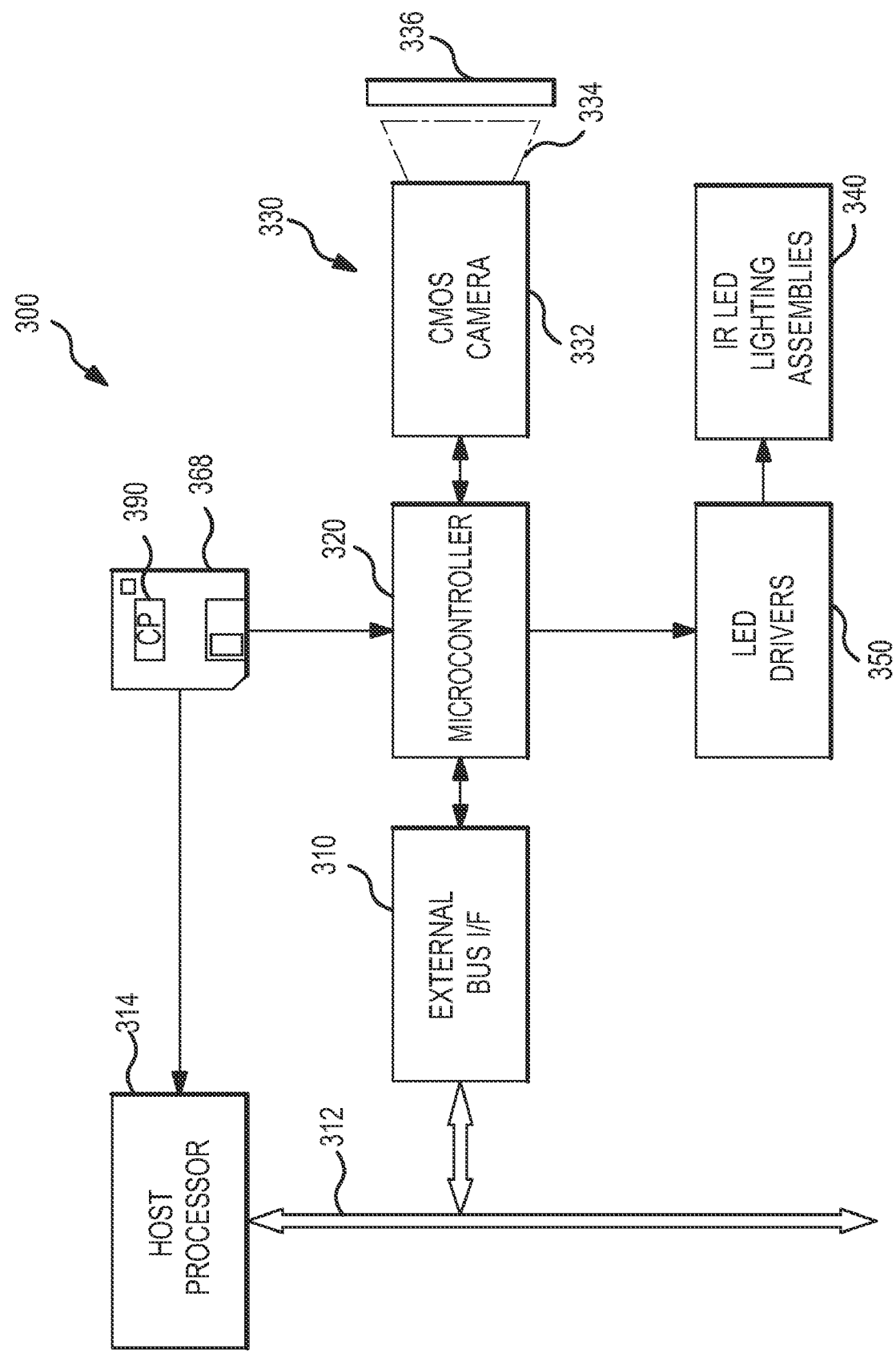
FIG. 3 illustrates a block diagram of the an image based bar-code reading and robotic registration apparatus for use in automated tape library systems according to the present invention.

FIG. 3 illustrates a block diagram 300 of an image based bar-code reading and robotic registration system for use in automated tape library systems according to the present invention. An external bus interface 310 is coupled to an external communications bus 312. The external communications bus 312 may communicate with any type of host processor 314. The external bus interface 310 is connected to a microcontroller 320. The microcontroller 320 controls both the imager 330 and the lighting assemblies 340. The microcontroller 320 provides the control signals to, for example, the camera 332 and lens assembly 334. An IR filter 336 may be provided at the lens of the imager 330.

The microcontroller 320 also drives LED drivers 350. The LED drivers 350 provide signals to the IR LED lighting assemblies 340. As discussed above, during operation, the lighting 340 mounted to the picker provides specular reflection off of the cartridge cells during calibration operations to allow cartridge registration.

The system 300 may also double as a bar-code reader thereby eliminating the need for a costly laser-based scanner. The image processing system 300 will operate with two possible modes of operation. It can be operate as either a bar-code reader to provide bar code resolution or as a registration sensor. The state of the system 300 determines the type of output it provides. As a bar-code reader, the system 300 outputs the values of bar-codes to the external bus interface 310. As a registration sensor, the system 300 outputs an offset value of some detected image feature from its nominal location in the x, y plane to the external bus interface 310.

The system 300 uses imaging techniques by combining imagers 330 and inexpensive, yet powerful, microcontrollers 320. The entire system 300 is mounted on the picker assembly and is therefore completely self-contained. Calibration could be verified on every single pick operation, and a need for a separate bar-code scanner is eliminated, thereby reducing system cost. The present invention also increases product reliability because it continuously visually verifies the position of the picker, eliminating the need for time consuming recalibration. During operation, the lighting 340 mounted to the picker provides specular reflection off of the cartridge cells during calibration operations. More diffuse lighting may be selected for bar-code reading.

Figure 4:
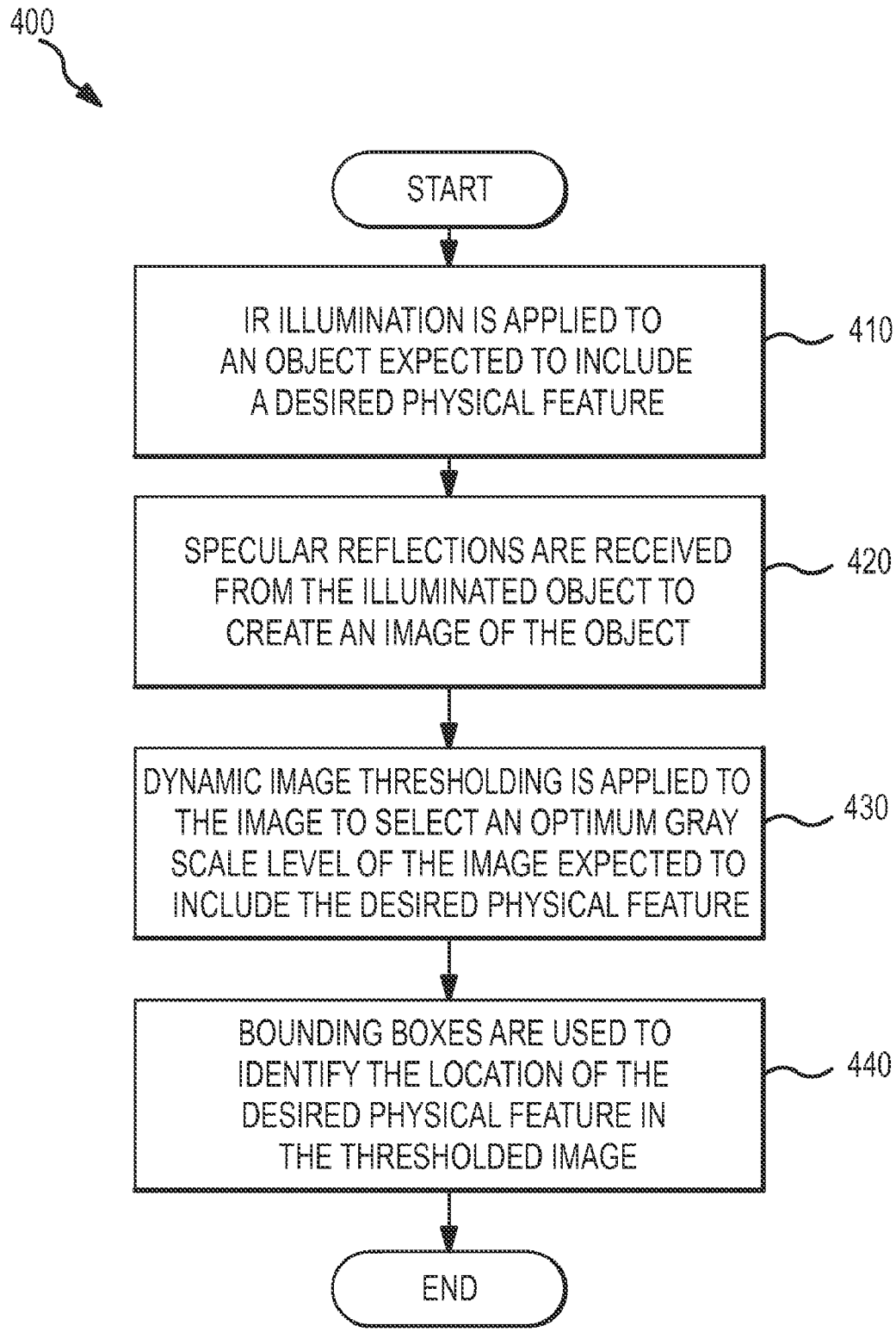
FIG. 4 illustrates a flow chart of the image based bar-code reading and robotic registration method for use in automated tape library systems according to the present invention.

FIG. 4 illustrates a flow chart 400 of the image based bar-code reading and robotic registration method for use during the registration mode in automated tape library systems according to the present invention. First, IR illumination is applied to an object expected to include a desired physical feature 410, e.g., a corner of a cell for holding a tape cartridge. Specular reflections are received from the illuminated object to create an image of the object 420. Dynamic image thresholding is applied to the image to select an optimum gray scale level of the image expected to include the desired physical feature 430. The dynamic image threshold enhances relevant portions of the image and suppresses irrelevant portions of the image. Bounding boxes are used to identify the location of the desired physical feature in the thresholded image 440.

Figure 5:
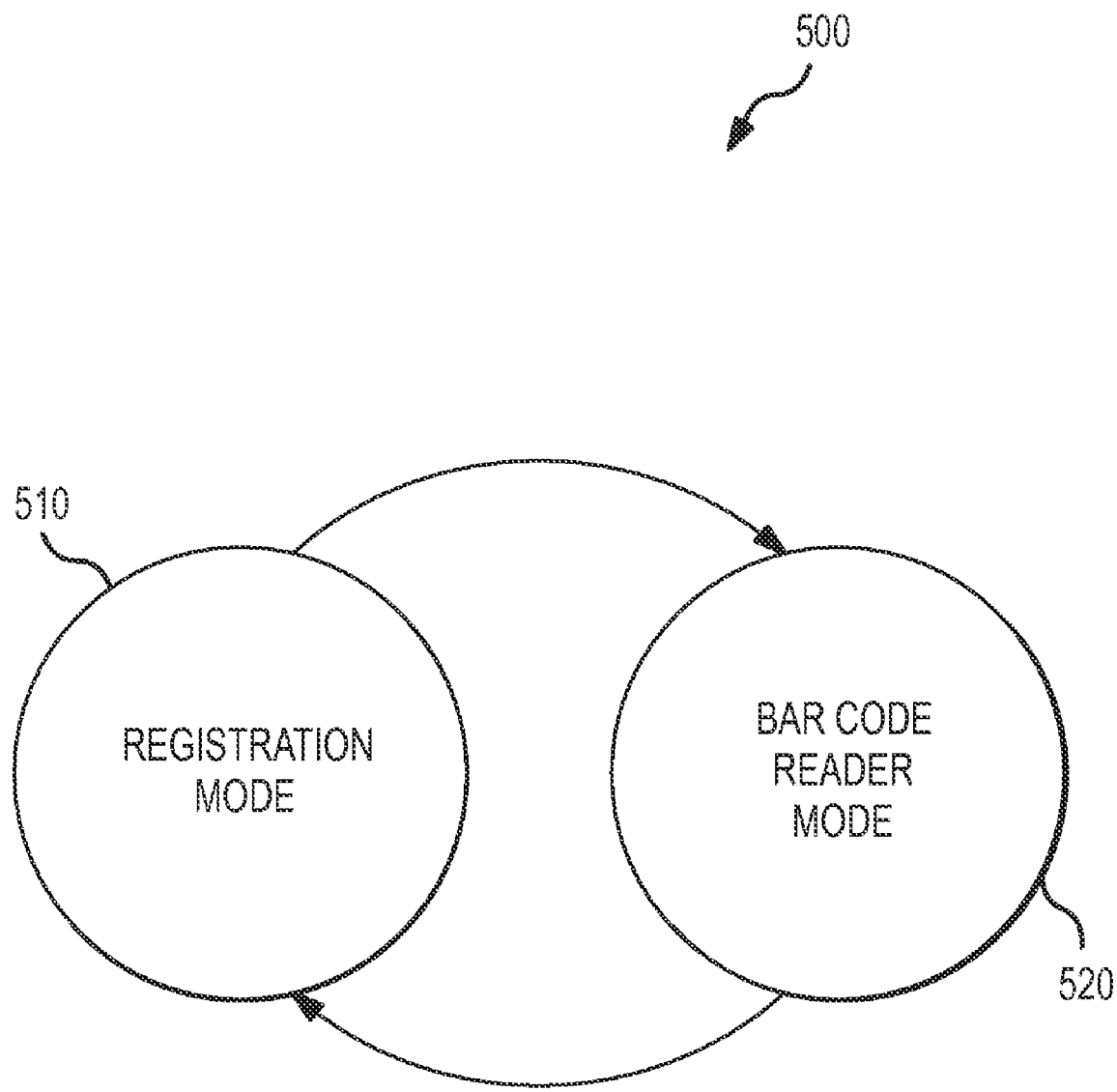
FIG. 5 illustrates the two modes of operation 500 of the image processing system according to the present invention.

FIG. 5 illustrates the two modes of operation 500 of the image processing system according to the present invention. As can be seen in FIG. 5, the image processing system may operate in a registration mode 510. The registration mode 510 is the mode of operation described above with reference to FIG. 4. The image processing system may also operate in a bar code reader mode 520.

Referring again to FIG. 3, an image based bar-code reading and robotic registration system 300 according to the present invention is shown, wherein the process illustrated with reference to FIG. 4 may be tangibly embodied in a computer-readable medium or carrier, e.g. one or more of the fixed and/or removable data storage devices 368 illustrated in FIG. 3, or other data storage or data communications devices. A computer program 390 expressing the processes embodied on the removable data storage devices 368 may be loaded into the microcontroller 320 or into a processor 314 coupled to the external communications bus 312 to configure the microcontroller 320 or host processor 314 of FIG. 3, for execution. The computer program 390 comprise instructions which, when read and executed by the microcontroller 320 or host processor 314 of FIG. 3, causes the microcontroller 320 or host processor 314 to perform the steps necessary to execute the steps or elements of the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for aligning a tape cartridge accessor with cartridges including bar codes stored in cells of a tape cartridge magazine, comprising:

applying specular illumination, via an illumination source comprising an infrared light emitting diode (IR LED) disposed on a front of the tape cartridge accessor, to an object expected to include a desired physical feature during calibration;

receiving specular reflections, via a complementary metal oxide semiconductor (CMOS) imager disposed on the front of the tape cartridge accessor, from the illuminated object to create an image of the object;

applying dynamic image thresholding to the image, via the CMOS imager, to select an optimum gray scale level of the image expected to include the desired physical feature;

using bounding boxes, via the CMOS imager, to identify the location of the desired physical feature in the thresholded image; and applying diffuse illumination, via the illumination source, to the bar codes when reading the bar codes.

2. The method of claim 1 wherein the desired physical feature comprises a corner of a cell in a tape cartridge magazine.

3. The method of claim 1 wherein the applying dynamic image thresholding enhances relevant portions of the image and suppresses irrelevant portions of the image.

4. The method of claim 1 wherein the tape cartridge cells are used as fiducials to allow tape cartridge registration without fiducial markings.

5. The method of claim 4 wherein the use of the tape cartridge cells as fiducials maximizes storage capability.

6. An article of manufacture comprising a program storage medium readable by a computer, the medium tangibly embodying one or more programs of instructions executable by the computer to perform a method for aligning a tape cartridge accessor with cartridges including bar codes stored in cells of a tape cartridge magazine, the method comprising:

applying specular illumination, via an illumination source comprising an infrared light emitting diode (IR LED), to an object expected to include a desired physical feature during calibration;

receiving specular reflections, via a complementary metal oxide semiconductor (CMOS) imager, from the illuminated object to create an image of the object;

applying dynamic image thresholding, via the CMOS imager, to the image to select an optimum gray scale level of the image expected to include the desired physical feature;

using bounding boxes to identify the location of the desired physical feature in the thresholded image; and applying diffuse illumination to the bar codes when reading the bar codes.

7. The article of manufacture of claim 6 wherein the desired physical feature comprises a corner of a cell in a tape cartridge magazine.

8. The article of manufacture of claim 6 wherein the applying dynamic image thresholding enhances relevant portions of the image and suppresses irrelevant portions of the image.

9. The article of manufacture of claim 6 wherein the tape cartridge cells are used as fiducials to allow tape cartridge registration without fiducial markings.

10. The article of manufacture of claim 9 wherein the use of the tape cartridge cells as fiducials maximizes storage capability.

11. A system for aligning a tape cartridge accessor with cartridges including bar codes stored in cells of a tape cartridge magazine, comprising:

an infrared light emitting diode (IR LED) for applying specular illumination to an object expected to include a desired physical feature during calibration;

means for receiving specular reflections from the illuminated object to create an image of the object, the means for receiving the specular reflection disposed on the front of the tape cartridge accessor;

a complementary metal oxide semiconductor (CMOS) imager for applying dynamic image thresholding to the image to select an optimum gray scale level of the image expected to include the desired physical feature;

means for using bounding boxes to identify the location of the desired physical feature in the thresholded image; and means for applying diffuse illumination to the bar codes when reading the bar codes, the means for applying the diffuse illumination disposed on the front of the tape cartridge accessor.

12. The system of claim 11 wherein the desired physical feature comprises a corner of a cell in a tape cartridge magazine.

13. The system of claim 11 wherein the CMOS imager is configured to enhance relevant portions of the image and suppresses irrelevant portions of the image.

14. The system of claim 11 wherein the tape cartridge cells are used as fiducials to allow tape cartridge registration without fiducial markings.

15. The system of claim 14 wherein the use of the tape cartridge cells as fiducials maximizes storage capability.

* * * * *